(12) United States Patent
Bechtold et al.

(10) Patent No.: US 7,790,310 B2
(45) Date of Patent: Sep. 7, 2010

(54) PRISMATIC RECHARGEABLE BATTERY

(75) Inventors: Dieter Bechtold, Bad Vibel (DE); Ralf Joswig, Buchholz (DE); Kai Pelz, Springe (DE)

(73) Assignee: Varta Automotive Systems GmbH, Hannover (DE)

( * ) Notice: Subject to any disclaimer, the term of this patent is extended or adjusted under 35 U.S.C. 154(b) by 0 days.

(21) Appl. No.: 11/455,911

(22) Filed: Jun. 19, 2006

(65) Prior Publication Data
US 2007/0003830 A1 Jan. 4, 2007

Related U.S. Application Data

(63) Continuation of application No. PCT/DE2004/002587, filed on Nov. 23, 2004.

(30) Foreign Application Priority Data
Jan. 21, 2004 (DE) .................. 10 2004 003 066

(51) Int. Cl.
*H01M 2/24* (2006.01)
*H01M 2/04* (2006.01)
(52) U.S. Cl. .................. 429/159; 429/149; 429/153; 429/156; 429/158; 429/160; 429/175
(58) Field of Classification Search ................ None
See application file for complete search history.

(56) References Cited

U.S. PATENT DOCUMENTS

| | | |
|---|---|---|
| 4,587,183 A | 5/1986 | McCartney, Jr. |
| 4,900,643 A | 2/1990 | Eskra et al. |
| 5,017,446 A | 5/1991 | Reichman et al. |
| 5,059,496 A | 10/1991 | Sindorf |
| 5,206,987 A | 5/1993 | Mix |
| 5,225,292 A | 7/1993 | Korinek et al. |
| 5,227,260 A | 7/1993 | Rose et al. |
| 5,288,565 A | 2/1994 | Gruenstern |

(Continued)

FOREIGN PATENT DOCUMENTS

EP    1 059 680 A1    12/2000

(Continued)

OTHER PUBLICATIONS

International Preliminary Report on Patentability and Written Opinion of the International Searching Authority for PCT/DE2004/002587, Date of Mailing Jan. 22, 2007, 4 pages.

(Continued)

*Primary Examiner*—Jonathan Crepeau
*Assistant Examiner*—Tony Chuo
(74) *Attorney, Agent, or Firm*—Foley & Lardner LLP (57) ABSTRACT

A prismatic rechargeable battery includes a housing comprising a plurality of cell vessels separated from one another by electrically insulating intermediate walls and a plate stack provided in each of the cell vessels, the plate stack comprising stacked electrode plates and a plurality of contacts. The battery also includes contact connector plates coupled to each of the intermediate walls such that each of the contact connector plates is in electrical contact with a contact of a plate stack. Each of the intermediate walls has a contact connector plate on a first side thereof electrically coupled to a contact connector plate on a second side thereof through the intermediate wall.

30 Claims, 10 Drawing Sheets

U.S. PATENT DOCUMENTS

| | | | |
|---|---|---|---|
| 5,338,624 A | | 8/1994 | Gruenstern et al. |
| 5,368,956 A | | 11/1994 | Gruenstern et al. |
| 5,408,735 A | * | 4/1995 | Schleicher ............... 29/432.2 |
| 5,501,918 A | | 3/1996 | Gruenstern et al. |
| 5,508,131 A | | 4/1996 | Bowen et al. |
| RE36,102 E | | 2/1999 | Dougherty |
| 6,007,944 A | | 12/1999 | Bechtold et al. |
| 6,780,540 B2 | | 8/2004 | Hoffman et al. |
| 2003/0027040 A1 | | 2/2003 | Asahina et al. |
| 2003/0027041 A1 | * | 2/2003 | Hamada et al. ............. 429/161 |
| 2003/0031920 A1 | | 2/2003 | Hoffman et al. |
| 2003/0059670 A1 | | 3/2003 | Bechtold et al. |
| 2003/0077508 A1 | * | 4/2003 | Asahina et al. ............. 429/160 |
| 2003/0157402 A1 | * | 8/2003 | Hamada et al. ............. 429/153 |
| 2005/0153200 A1 | | 7/2005 | Wiepen |

FOREIGN PATENT DOCUMENTS

| | | |
|---|---|---|
| EP | 1059680 A1 | 12/2000 |
| EP | 1 091 427 A1 | 4/2001 |
| EP | 1 093 170 A1 | 4/2001 |
| EP | 1093170 A1 | 4/2001 |
| EP | 1091427 A1 | 11/2001 |
| JP | 1 087 449 A1 | 3/2001 |
| JP | 2003/1237730 | 4/2003 |
| JP | 2003123730 | 4/2003 |
| WO | WO 03/015194 | 2/2003 |

OTHER PUBLICATIONS

International Search Report for PCT/DE2004/002587, Date of mailing Apr. 18, 2005, 3 pages.

Office Action for U.S. Appl. No. 12/068,728, dated Feb. 2, 2010, 11 pages.

* cited by examiner

PRISMATIC RECHARGEABLE BATTERY

CROSS-REFERENCE TO RELATED PATENT APPLICATIONS

The present application is a Continuation of International Patent Application No. PCT/DE2004/002587, filed Nov. 23, 2004, which claims priority to German Priority Application DE 10 2004 003 066.9, filed Jan. 21, 2004. The present application claims the benefit of and incorporates by reference herein the entire disclosures of International Patent Application No. PCT/DE2004/002587 and German Priority Application DE 10 2004 003 066.9, including the specification, drawings, claims and abstract.

BACKGROUND

The present invention relates to batteries such as prismatic rechargeable batteries. More specifically, the present invention relates to prismatic rechargeable batteries having a housing which has a plurality of cell vessels which are separated from one another by electrically insulating intermediate walls, and having plate stacks which are formed from stacked electrode plates, with one plate stack being held in each of the cell vessels. The present invention also relates to a method for production of a prismatic rechargeable battery such as this.

Prismatic rechargeable batteries are well known and comprise a plurality of encapsulated battery cells which are arranged alongside one another in a common housing, are each formed from stacked electrode plates, and are filled with electrolyte.

EP 1 087 449 A1 discloses a typical conventional prismatic rechargeable battery. The battery cells, which have a large number of stacked electrode plates, are inserted from above into associated vessels in a housing, with the cover open. The cell vessels are in this case formed by electrically insulating intermediate walls. Output conductor plates are provided on the opposite sides of the battery cells, which are adjacent to the intermediate walls, and are each welded to the positive and negative electrode plates. The output conductor plates are guided upwards in a dead space in the housing in the area of the cover, where they are welded to the adjacent output conductor plate, in order to produce an electrical connection.

In order to shorten the current-carrying paths, WO 03/015194 A1 proposes that contact connections on the front face be welded in cutouts in the housing to the respective battery cells which are adjacent to output conductor plates arranged on the opposite sides of an intermediate wall.

It would be advantageous to provide an improved prismatic rechargeable battery which has as low an internal resistance as possible and has a higher packing density to reduce dead space within the battery. It would also be advantageous to provide an improved method for the production of a prismatic rechargeable battery.

SUMMARY

One embodiment of the invention relates to a prismatic rechargeable battery that includes a housing comprising a plurality of cell vessels separated from one another by electrically insulating intermediate walls and a plate stack provided in each of the cell vessels, the plate stack comprising stacked electrode plates and a plurality of contacts. The battery also includes contact connector plates coupled to each of the intermediate walls such that each of the contact connector plates is in electrical contact with a contact of a plate stack. Each of the intermediate walls has a contact connector plate on a first side thereof electrically coupled to a contact connector plate on a second side thereof through the intermediate wall.

Another embodiment of the invention relates to a method for producing a prismatic rechargeable battery that includes providing a battery housing comprising a plurality of cell vessels separated by intermediate walls. The method also includes providing contact connector plates on opposite sides of each of the intermediate walls and electrically coupling the contact connector plates provided on opposite sides of the intermediate walls to each other through their associated intermediate walls. The method further includes arranging plate stacks in the cell vessels, each of the plate stacks having a plurality of contacts and welding the electrical contacts of the plate stacks to contact connector plates provided on the intermediate walls. The method further includes closing the housing such that the cell vessels and the housing are sealed.

BRIEF DESCRIPTION OF THE DRAWINGS

The invention will be explained in more detail in the following text with reference to the attached drawings, in which.

DETAILED DESCRIPTION

According to an exemplary embodiment, a method of producing a prismatic rechargeable battery includes the steps of (a) production of an electrical connection between contact connector plates which are in each case arranged on the opposite sides of an intermediate wall, through the intermediate wall; (b) arrangement of plate stacks in the cell vessels which are formed by the intermediate walls; (c) welding of the electrical contacts of the plate stacks to the contact connector plates; and (d) closure of the housing in such a manner that the cell vessels and the housing are sealed.

The prismatic rechargeable battery includes contact connector plates that extend along each of the intermediate walls, are electrically conductively connected to one another through the intermediate wall on contact connector plates which are opposite on the intermediate wall, and the contacts of the plate stacks are electrically conductively connected to the associated contact connector plates.

The additional contact connector plates make it possible to first of all produce an electrical field-contact between adjacent contact connector plates through the respective intermediate wall. In consequence, no dead space is required in the cover in order to make contact. Furthermore, this creates an approximately direct connection between the contact connector plates with as low an internal resistance as possible.

Once the plate stacks have been introduced into the cell vessels, the contacts on the plate stacks can then be electrically conductively connected to the contact connector plates, for example by welding, soldering, or brazing.

In order to further reduce the internal resistance, it is advantageous if the contact connector plates are electrically connected a plurality of times over their length to an associated contact connector plate which is arranged on the opposite side of the intermediate wall. A particularly low internal resistance can be achieved if the electrical connection of associated contact connector plates is produced by a clinch-joining process, by cold-surface-pressing of the associated contact connector plates.

The contacts on the plate stacks are preferably in the form of output conductor plates, with the side edges of the positive electrode plates in a plate stack being welded to a first output conductor plate, and the side edges of the negative electrode plates in the plate stack being welded to a second output conductor plate at the opposite end of the plate stack. The output conductor plates are then preferably welded to the associated contact connector plates over the entire length.

It is particularly advantageous for the contacts in the plate stacks to be welded to the associated contact connector plates, and, furthermore, to be soldered to the outer edges of the welded joint. This makes it possible to achieve a mechanically high-strength joint, which is electrically highly conductive, can carry high currents and has a very low internal resistance.

Simple design and production of the prismatic rechargeable battery are achieved by inserting the plate stacks into the cell vessels on the front face of the housing, rather than from above in the conventional manner. The side edges of the output conductor plates and contact connector plates are then exposed, and can easily be welded to one another, and if required soldered, in an accessible manner. The front cover of the housing is then placed on the side edges to the intermediate walls and side edges of the housing and is welded to them, forming a seal, for example by means of known laser welding methods.

Figure 1:
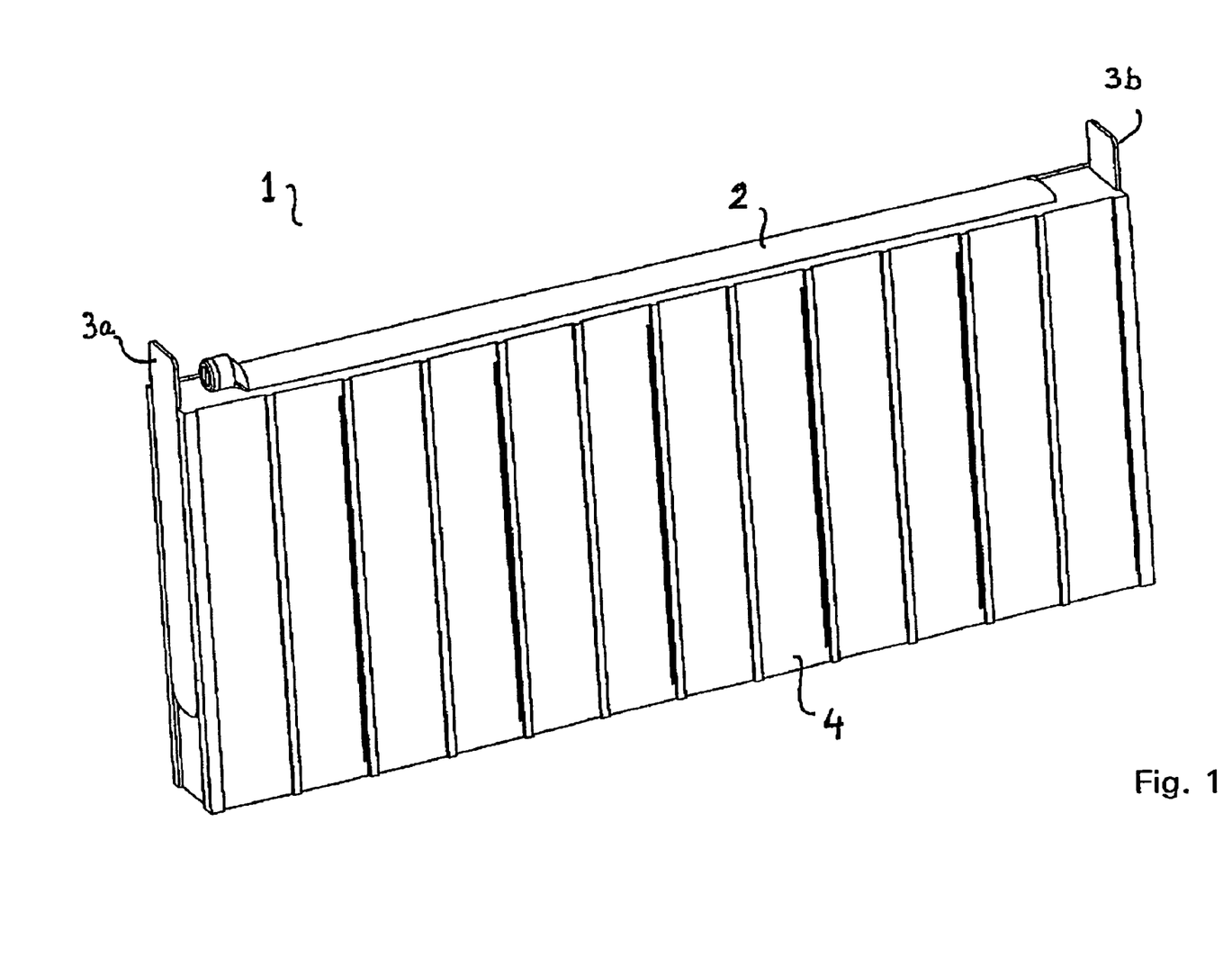
FIG. 1 shows a perspective illustration of a prismatic rechargeable battery according to an exemplary embodiment.

FIG. 1 shows a perspective view of a prismatic rechargeable battery 1. A degassing channel 2 is placed on the upper face of the housing. Furthermore, connecting contacts 3a, 3b for the positive and negative pole connection of the prismatic rechargeable battery 1 are fitted to the mutually opposite narrow faces of the housing.

The housing of the rechargeable battery 1 is closed by a front cover 4, which is placed on the housing and is welded to it, forming a seal.

Figure 2:
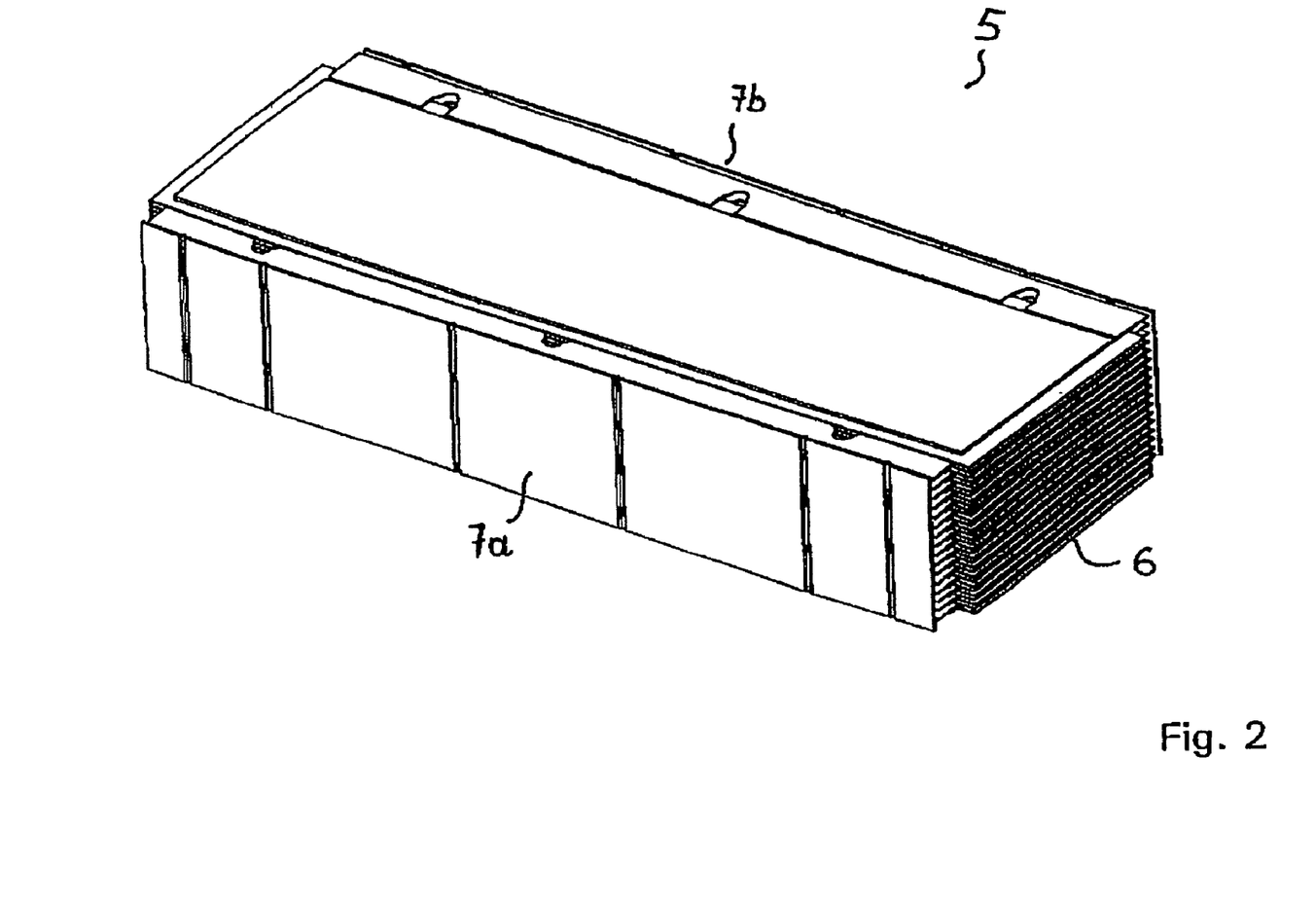
FIG. 2 shows a perspective illustration of a plate stack with stacked electrode plates and output conductor plates.

FIG. 2 shows a perspective view of a plate stack 5. This clearly shows that a large number of positive and negative electrode plates 6, which are stacked alternately one on top of the other, form the plate stack 5. The connecting lugs of the positive electrode plates 6 are passed to the outside on one side of the plate stack 5, where they are electrically conductively connected and mechanically joined to an output conductor plate 7a with the aid of known laser welding processes. The connections of the negative electrode plates 6 are connected in a corresponding manner to an output conductor plate 7b on the opposite side of the plate stack 5.

Figure 3:
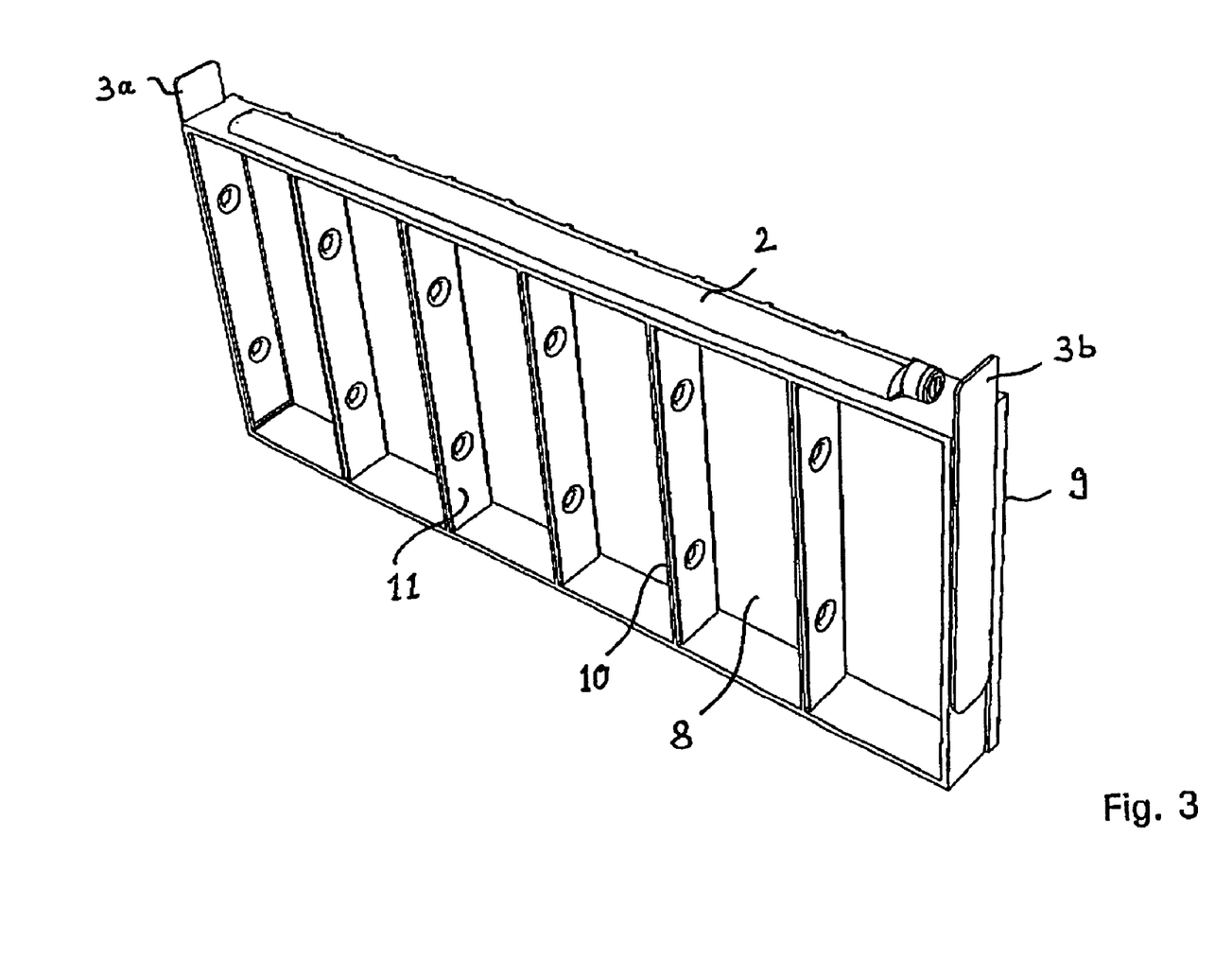
FIG. 3 shows a perspective illustration of the opened housing of the prismatic rechargeable battery shown in FIG. 1, without a front panel.

Plate stacks 5 (battery cells) such as these which are known per se are introduced into cell vessels 8 which are formed in the housing 9 by intermediate walls 10 which extend from the bottom to the cover of the housing 9. Contact connector plates 11 are provided on both upper faces of the intermediate walls 10 and extend over the entire length of the intermediate walls 10. The contact connector plates 11 which are located opposite on one intermediate wall 10 make contact with one another through the intermediate wall 10. This is preferably done with the aid of clinch joining processes, by the contact connector plates 11 being cold-joined without any additional material, in the area of the hole in the intermediate walls 10. The connecting contacts 3a, 3b are connected in a corresponding manner to the outer contact connector plates 11 on the inner walls of the narrow faces of the housing 9.

Figure 4:
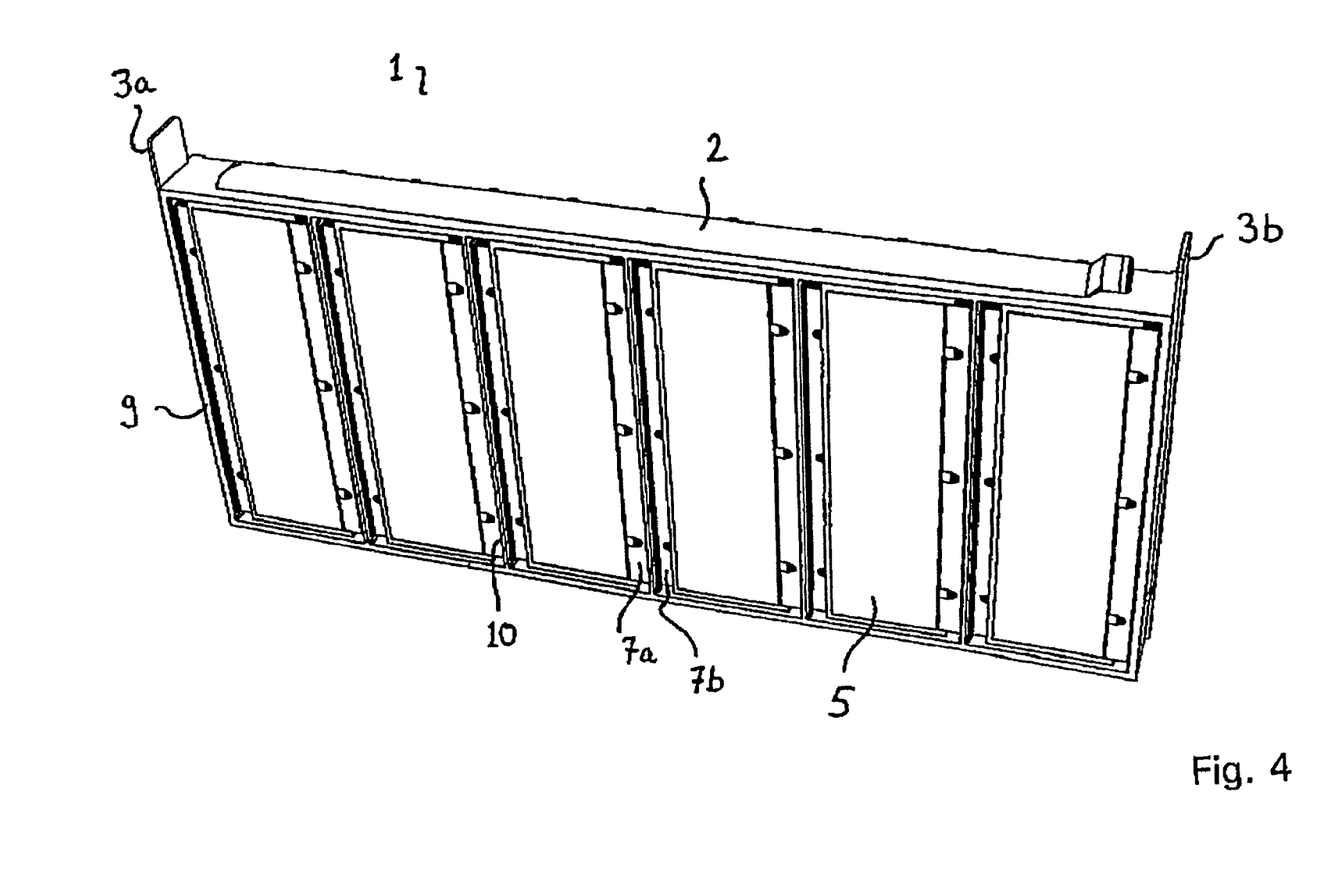
FIG. 4 shows a perspective illustration of the prismatic rechargeable battery shown in FIG. 1, with a plate stack having been inserted into the cell vessels, but without a front panel.

As can be seen from FIG. 4, the plate stacks 5 are inserted into the cell vessels 8 in the housing 9. In this case, there is no longer any need for any dead space in the upper and lower area of the housing 9, since contact is made between the plate stacks 5 via the output conductor plates 7 and contact connector plates 11 on the longitudinal face of the plate stacks 5, and not in the area of the cover of the housing 9.

For this purpose, the output conductor plates 7 and contact connector plates 11, which are located directly alongside one another, are welded and/or soldered to one another, preferably over the entire length of the exposed edges of the output conductor plates 7 and contact connector plates 11, with the housing 9 open and without the front cover 4. It is particularly advantageous for a soldered joint to be applied to the outer edge of the weld bead or the output conductor plate 7 and contact connector plate 11.

Figure 5:
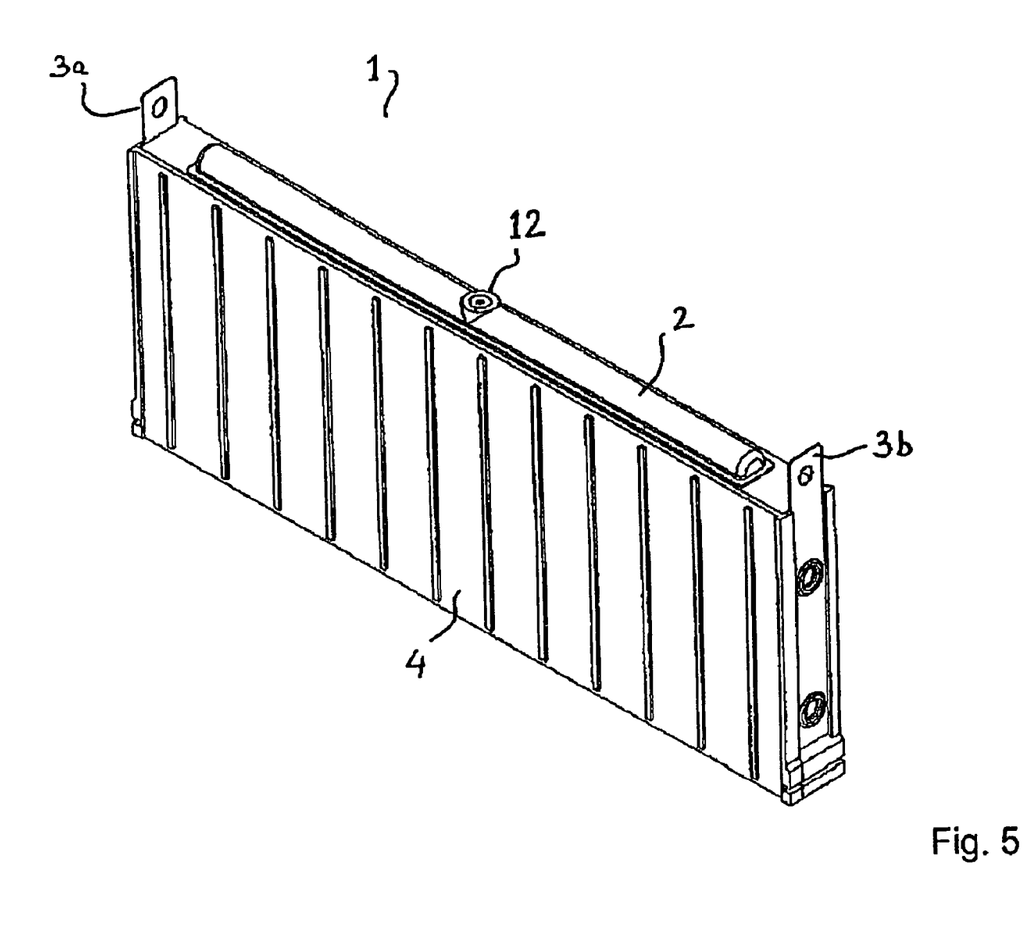
FIG. 5 shows a perspective illustration of a second embodiment of a prismatic rechargeable battery according to an exemplary embodiment.

FIG. 5 shows a perspective view of a second embodiment of a prismatic rechargeable battery 1. The connecting contacts 3a and 3b are cold-surface-pressed by means of a clinch joining process to the associated internal contact connector plate at two points over the height of the rechargeable battery 1. Furthermore, the degassing valve 12 for the degassing channel is provided centered in the degassing channel 2 rather than on the side, as in the first embodiment shown in FIG. 1.

Figure 6:
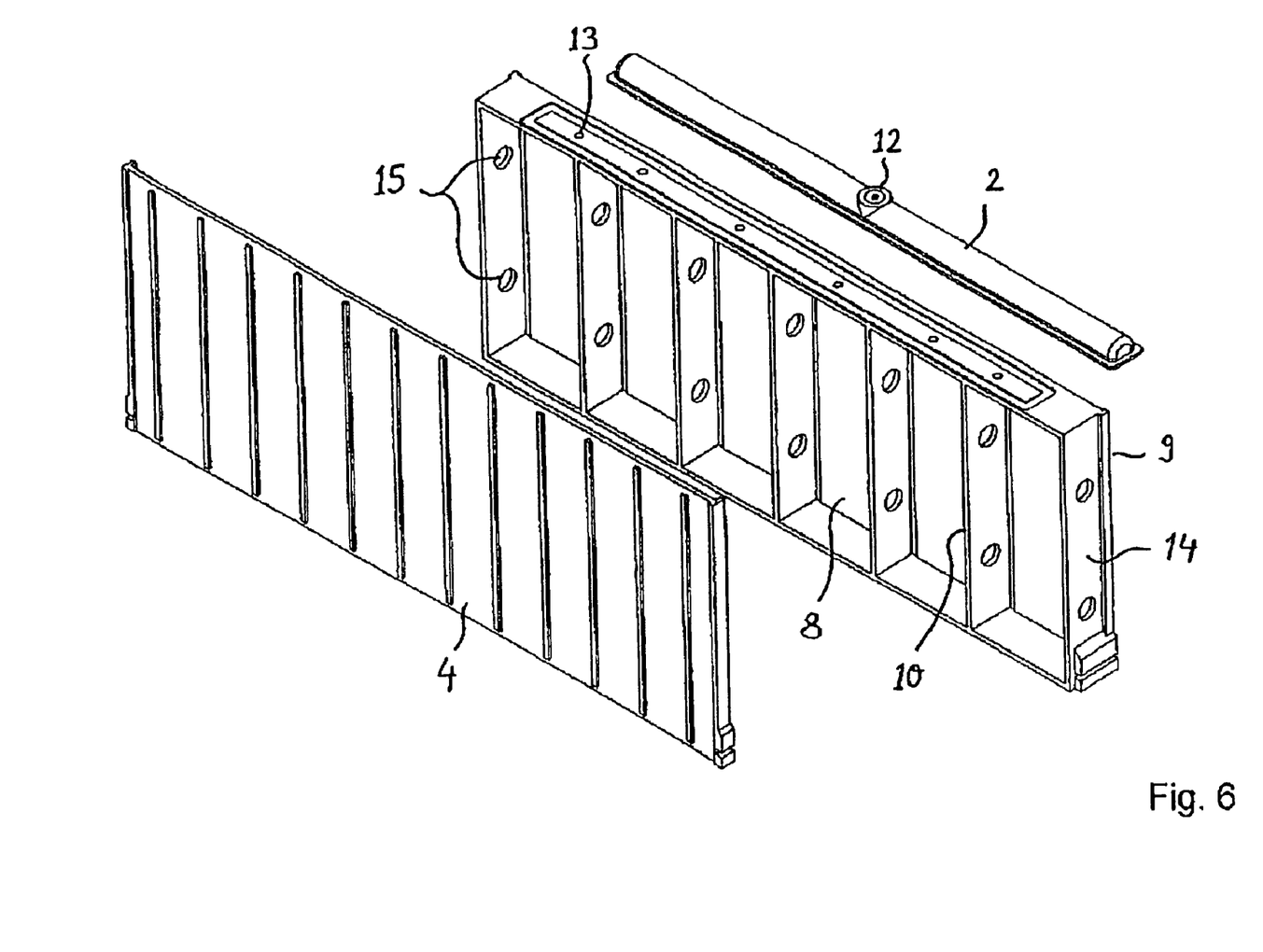
FIG. 6 shows a perspective exploded view of the housing of the prismatic rechargeable battery shown in FIG. 5.

FIG. 6 shows an exploded view of the prismatic rechargeable battery 1 shown in FIG. 5. The degassing channel 2 is placed on the upper face of the housing 9, in which degassing holes 13 are incorporated for each cell vessel 8.

Two holes 15 are in each case provided on the outer narrow faces 14 of the housing and on the intermediate walls 10, through which adjacent contact connector plates 11 are connected to one another, and contact connector plates 11 are electrically conductively permanently connected to one another, by means of the contact connections 3, on the narrow faces 14. A clinch joining process is preferably used for this purpose. Other methods, such as screwing, riveting, welding, soldering, and the like are, however, also possible.

If required, sealing elements are provided, such as O-rings or a coating in order to seal the holes 15, once contact has been made with the contact connector plates 11.

The use of a plurality of connection points within the physical height of the contact connector plates 11 further reduces the internal resistance.

Figure 7:
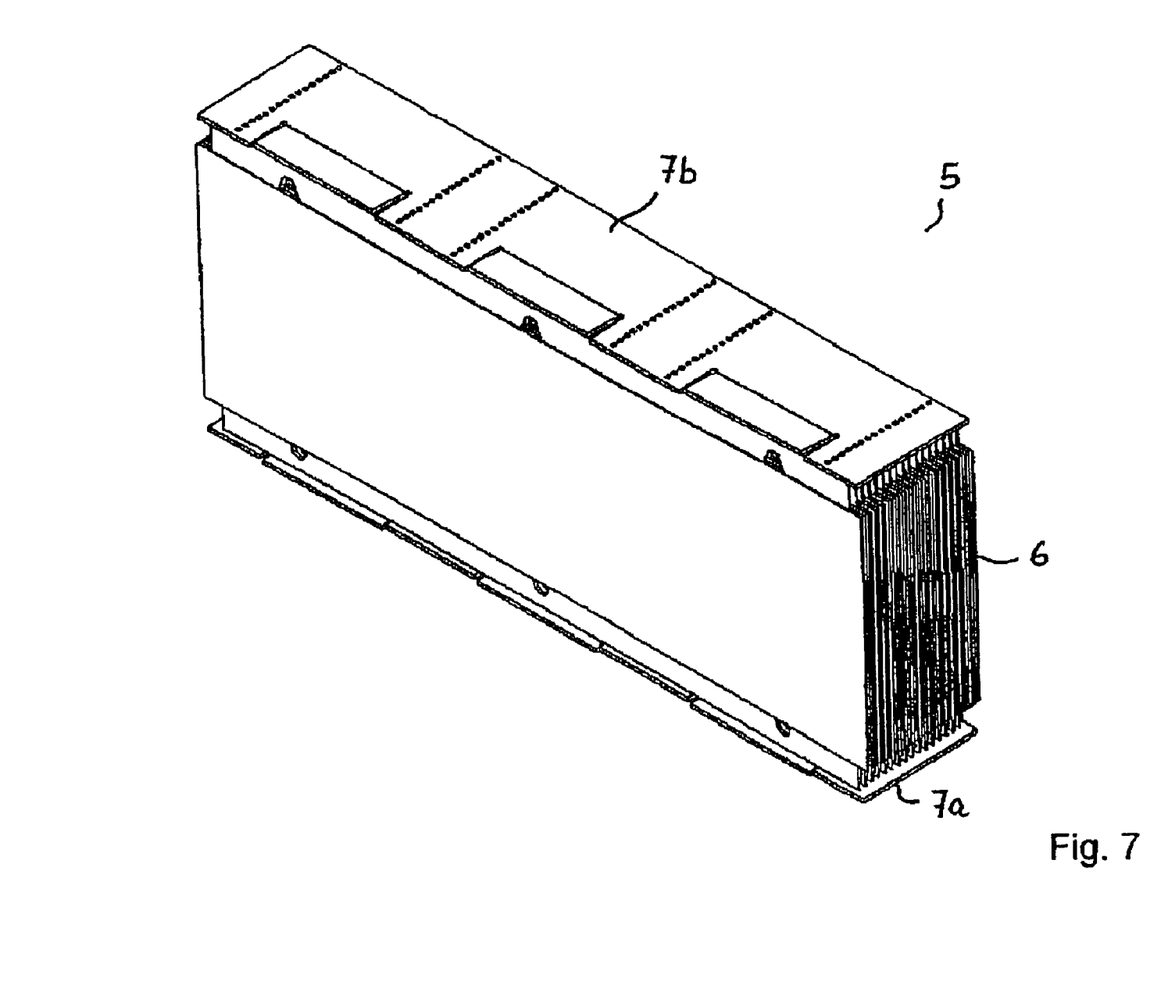
FIG. 7 shows a perspective illustration of a plate stack with a second embodiment of output conductor plates.

FIG. 7 shows a perspective view of a plate stack 5 with one exemplary embodiment of output conductor plates 7a and 7b. These are connected to the contact lugs of associated electrode plates 6 at a plurality of points in the lateral direction, by means of a laser welding process.

Figure 8:
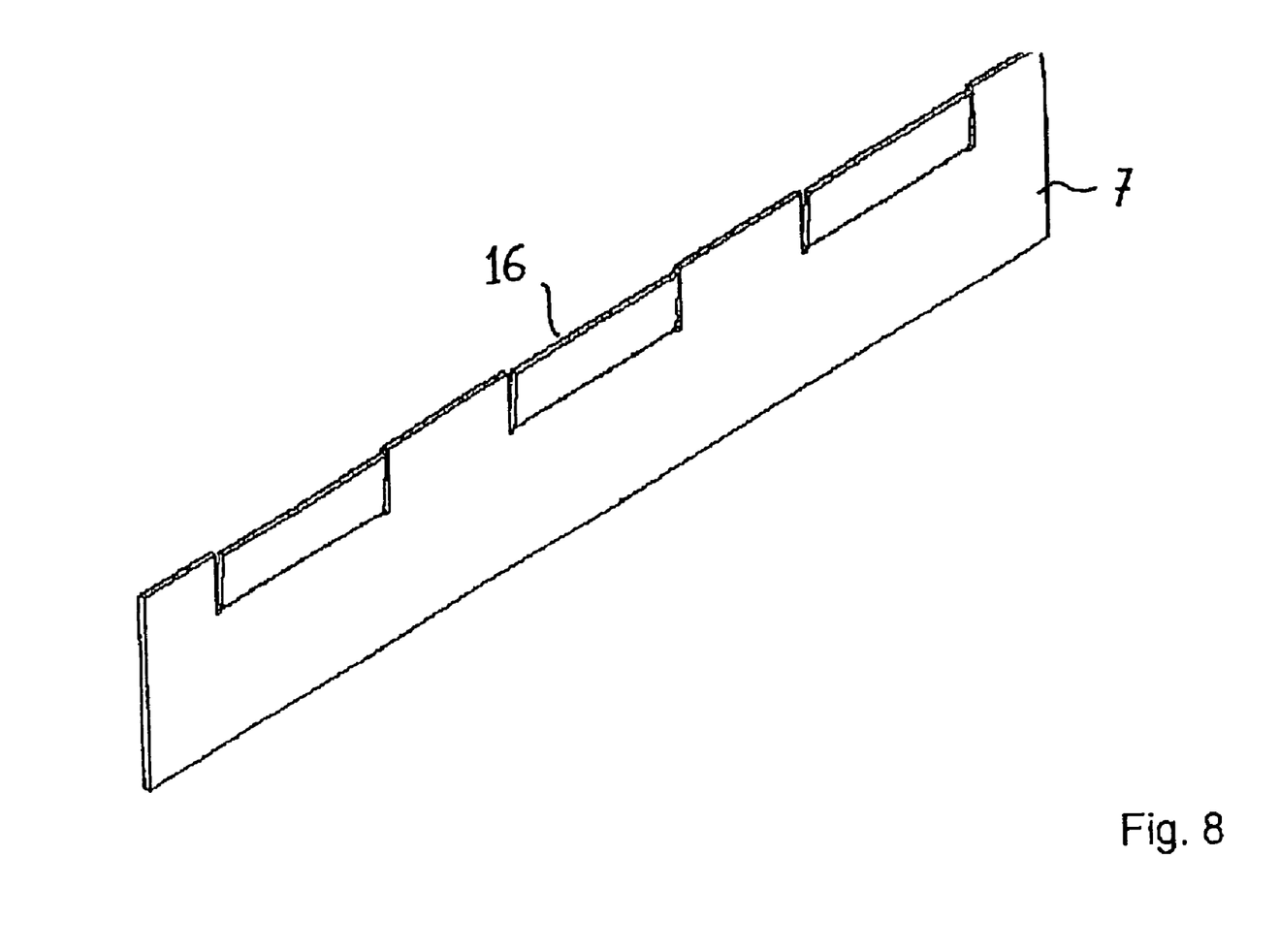
FIG. 8 shows a perspective illustration of the output conductor plate shown in FIG. 7.

As can clearly be seen from FIG. 7 and the perspective detailed view of the output conductor plates 7 in FIG. 8, the improved embodiment of the output conductor plate 7 has slightly angled connecting sections 16 cut into it. These connecting sections 16 are located in the area of the housing opening, with the front cover 4 removed, in a plate stack 5 which has been inserted into the cell vessel 8. By way of example, three connecting sections 16 are provided over the length of the output conductor plate 7.

Figure 9:
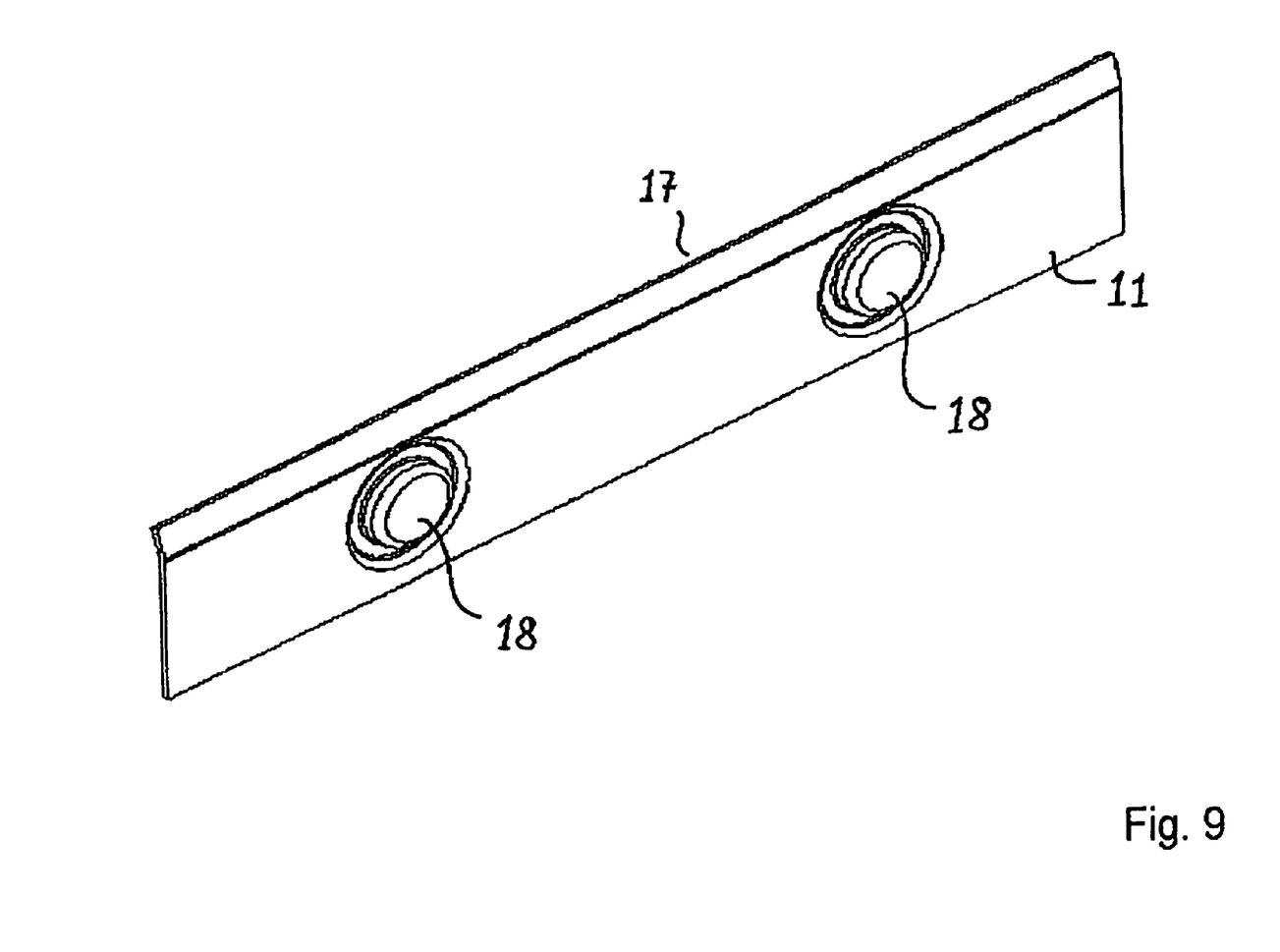
FIG. 9 shows a perspective illustration of a contact connector plate.

FIG. 9 shows one exemplary embodiment of a contact connector plate 11 which likewise has an angled outer edge 17, which is adjacent to the connecting sections 16 of the associated output conductor plate 7 when the rechargeable battery 1 is in the assembled state.

As can also be seen, cylindrical contact sections 18 with a circumferential recess are preformed in the area of the holes 15 in the intermediate walls 10. The insertion of pressing tools into the cylindrical contact sections 18 and the application of a high pressure force make it possible to produce a permanent cold-form joint between the contact sections 18 of adjacent contact connector plates 11 through the hole 15 in the intermediate wall 10 between them. A joint such as this has a very low internal resistance.

Figure 10:
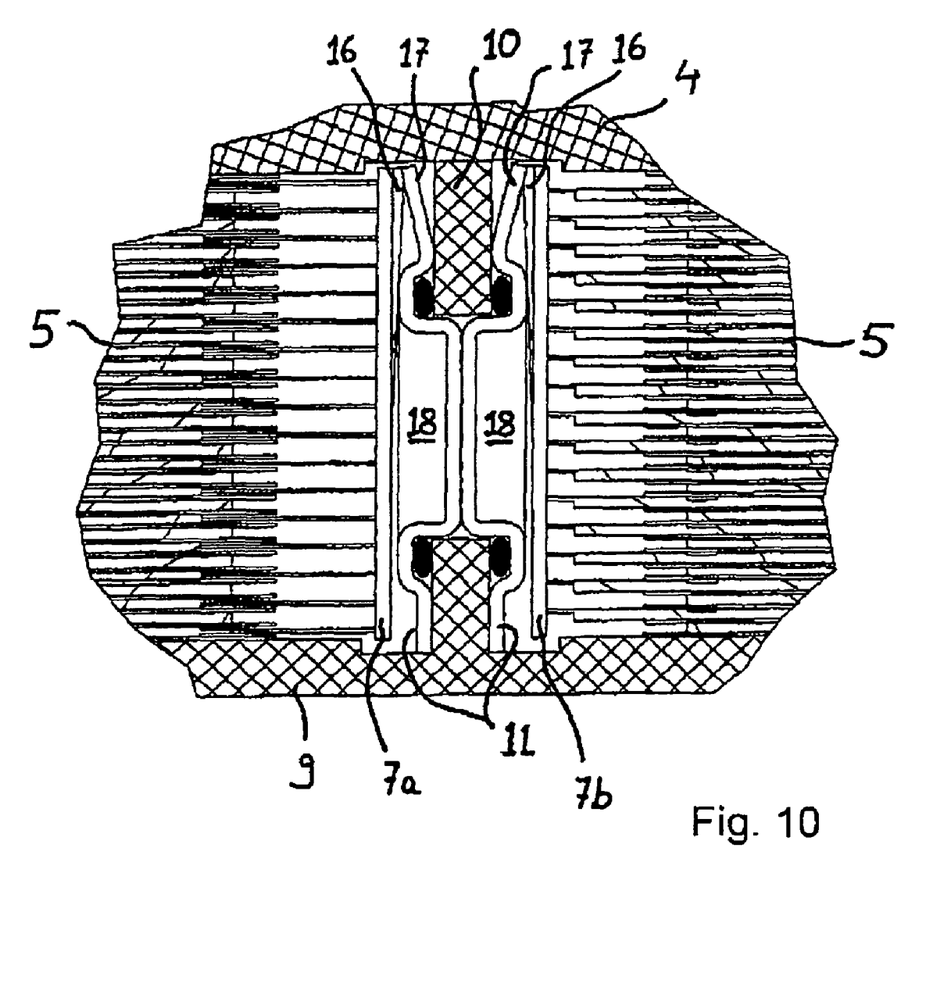
FIG. 10 shows a section view of a detail of the prismatic rechargeable battery shown in FIG. 6 in the area of the intermediate walls and of the connections between adjacent plate stacks.

FIG. 10 shows a section view through a detail of the prismatic rechargeable battery 1, as is sketched in FIGS. 5 to 9. This shows a detail of the housing in the area of an intermediate wall 10, onto which a front cover 4 is fitted in order to close the housing 9. The front cover 4 which closes the front face of the housing 9 is located at the top in the illustration.

As can also be seen, the connecting sections 16 of the output conductor plate 7a, 7b of the plate stacks 5 which have been inserted into the cell vessels 8 are aligned with the adjacent front cover 4 and are angled from the respective plate stack 5 in the direction of the adjacent cell wall 10.

As can also be seen, the contact connector plates 11 which are arranged on both sides of the intermediate wall 10 are electrically connected to one another by means of the contact sections 18 through the intermediate wall 10. The outer edge 17 of the contact connector plates 11, which is adjacent to the front cover 4, extends away from the intermediate wall 10 to the adjacent output conductor plate 7. The angled outer edge 17 of a contact connector plate 11 is welded to the adjacent angled connecting section 16 of the associated output conductor plate 7. A soldered joint is preferably also formed between the contact connector plate 11 and the associated output conductor plate 7 on the outer edges of the welded joint.

It is important to note that the construction and arrangement of the prismatic rechargeable battery as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions as expressed in the appended claims.

The invention claimed is:

1. A prismatic rechargeable battery comprising: a housing comprising a plurality of cell vessels separated from one another by electrically insulating intermediate walls, the housing comprising a front side that is substantially open; a plate stack provided in each of the cell vessels, each plate stack comprising stacked electrode plates and a plurality of contacts; and contact connector plates coupled to each of the intermediate walls such that each of the contact connector plates is in electrical contact with a contact of a plate stack; wherein each of the intermediate walls has a first contact connector plate on a first side thereof electrically coupled to a second contact connector plate on a second side thereof through the intermediate wall; wherein an external front cover of the housing is coupled to longitudinal side edges of the intermediate walls and side walls of the housing to close the front side of the housing and seal the plurality of cell vessels; wherein the area covered by the front cover is substantially the same as the area of the largest side of the prismatic rechargeable battery.

2. The prismatic rechargeable battery of claim 1, wherein the contact connector plates on the first sides of the intermediate walls are electrically coupled to the contact connector plates on the second sides of the intermediate walls at a plurality of locations.

3. The prismatic rechargeable battery of claim 1, wherein the electrical connection between the contact connector plates on the first sides of the intermediate walls and the contact connector plates on the second sides of the intermediate walls is a cold-surface-pressed clinch joint.

4. The prismatic rechargeable battery of claim 1, wherein the contacts of the plate stacks are welded to the associated contact connector plates to form a welded joint.

5. The prismatic rechargeable battery of claim 1, wherein each of the plate stacks comprises positive electrode plates and negative electrode plates, and side edges of the positive electrode plates are welded to a first output conductor plate and side edges of the negative electrode plates are welded to a second output conductor plate at an opposite end of the plate stack.

6. The prismatic rechargeable battery of claim 5, wherein the output conductor plates are welded to associated contact connector plates.

7. The prismatic rechargeable battery of claim 1, wherein the housing further comprises a degassing channel.

8. The prismatic rechargeable battery of claim 7, wherein the degassing channel further comprises a degassing valve centrally located in the degassing channel.

9. The prismatic rechargeable battery of claim 1, wherein the front cover is a single component.

10. The prismatic rechargeable battery of claim 1, wherein a first edge of each of the contact connector plates is angled away from the intermediate wall to make contact with the contact of the plate stack adjacent the front cover of the housing.

11. The prismatic rechargeable battery of claim 10, wherein each of the contacts of the plate stacks comprise an angled connecting section extending toward the angled outer edge of each of the associated contact connector plates.

12. The prismatic rechargeable battery of claim 10, wherein the first edge of each of the contact connector plates is coupled to the contact of the plate stack substantially over an entire length of the contact of the plate stack.

13. The prismatic rechargeable battery of claim 4, further comprising a soldered joint provided on an outer edge of each of the welded joints.

14. A prismatic rechargeable battery comprising: a plurality of plate stacks, the plate stacks comprising stacked electrode plates and a plurality of contacts; a housing configured to allow insertion of the plurality of plate stacks through an open front of the housing, the housing comprising a plurality of intermediate walls spaced apart from one another forming internal chambers to receive the plurality of plate stacks; and contact connector plates coupled to each of the intermediate walls such that each of the contact connector plates is in electrical contact with one of the plurality of contacts of one of the plurality of plate stacks; wherein each of the intermediate walls has a first contact connector plate on a first side thereof electrically coupled to a second contact connector plate on a second side thereof through the intermediate wall; wherein an external front cover of the housing is coupled to longitudinal side edges of the intermediate walls and side walls of the housing to close the open front of the housing to seal the internal chambers; wherein the area covered by the front cover is substantially the same as the area of the largest side of the prismatic rechargeable battery.

15. The prismatic rechargeable battery of claim 14, wherein the contact connector plates on the first sides of the intermediate walls are electrically coupled to the contact connector plates on the second sides of the intermediate walls at a plurality of locations.

16. The prismatic rechargeable battery of claim 15, wherein the contact connector plates extend the full length of the intermediate walls.

17. The prismatic rechargeable battery of claim 14, wherein each of the plate stacks comprises positive electrode plates and negative electrode plates, and side edges of the positive electrode plates are welded to a first output conductor plate and side edges of the negative electrode plates are welded to a second output conductor plate at an opposite end of the plate stack.

18. The prismatic rechargeable battery of claim 17, wherein the first and second output conductor plates have slightly angled connecting sections.

19. The prismatic rechargeable battery of claim 18, wherein each of the contact connector plates has an angled outer edge extending towards the angled connecting section of the associated first and second output conductor plates and is configured to contact the angled connecting section of the associated first and second output conductor plates.

20. The prismatic rechargeable battery of claim 19, wherein the angled outer edge of the contact connector plates is welded to the angled connecting section of the associated first and second output conductor plates to form a welded joint.

21. The prismatic rechargeable battery of claim 20, wherein a soldered joint is also formed between the contact connector plates and the associated output conductor plates on an outer edge of the welded joint.

22. The prismatic rechargeable battery of claim 14, wherein the front cover is a single piece.

23. The prismatic rechargeable battery of claim 19, wherein the angled outer edge of each of the contact connector plates is coupled to the angled connecting section of the associated first and second output conductor plates substantially over an entire length of the associated first and second output conductor plates.

24. A prismatic rechargeable battery comprising: a housing comprising a plurality of walls defining a plurality of internal chambers; a plurality of electrochemical cells provided in the housing, each of the cells provided in one of the chambers and comprising a plurality of electrode plates and a plurality of contacts; wherein each intermediate wall has a first contact connector plate on a first side thereof that is electrically coupled to a second contact connector plate on a second side thereof; wherein each of the contact connector plates is in electrical contact with an associated contact of one of the plurality of electrochemical cells; wherein a single external front cover is coupled to longitudinal side edges of each of the intermediate walls and side walls of the housing to seal the internal chambers; wherein the area covered by the front cover is substantially the same as the area of the largest side of the prismatic rechargeable battery.

25. The prismatic rechargeable battery of claim 24, wherein the contact connector plates on the first sides of the intermediate walls are electrically coupled to the contact connector plates on the second sides of the intermediate walls at a plurality of locations.

26. The prismatic rechargeable battery of claim 24, wherein the housing further comprises a degassing channel.

27. The prismatic rechargeable battery of claim 26, wherein the degassing channel further comprises a degassing valve centrally located in the degassing channel.

28. The prismatic rechargeable battery of claim 24, wherein a first edge of each of the contact connector plates is angled away from the intermediate wall to make contact with one of the contacts of the electrochemical cells adjacent the front cover of the housing.

29. The prismatic rechargeable battery of claim 28, wherein the first edge of each of the contact connector plates is coupled to the associated contact of the electrochemical cell substantially over an entire length of the contact of the electrochemical cell.

30. The prismatic rechargeable battery of claim 28, wherein each of the contacts of the electrochemical cells comprises a connecting section that is angled toward the associated contact connector plate to contact the first edge of the contact connector plate.

* * * * *